United States Patent [19]
Lawrence et al.

[11] Patent Number: 5,102,542
[45] Date of Patent: Apr. 7, 1992

[54] CONSTRUCTION OF CANISTER-TYPE FILTERS

[75] Inventors: Randall K. Lawrence, Bristol; Maurice Lallier, Johnson City; Henry Garfield, Bristol, all of Tenn.; Mark S. Howie, Abingdon, Va.

[73] Assignee: Electrolux Water Systems, Inc., Marietta, Ga.

[21] Appl. No.: 470,103

[22] Filed: Jan. 25, 1990

[51] Int. Cl.⁵ .............................................. B01D 24/10
[52] U.S. Cl. .................................... 210/264; 210/287; 210/321.84; 210/321.85; 210/321.86; 210/321.88; 210/437; 210/500.23; 210/510.1
[58] Field of Search .............. 210/282, 284, 652, 654, 210/321.78, 321.79, 321.8, 321.81, 510.1, 264, 287, 321.84, 321.86, 321.88, 437, 500.23, 321.85

[56] References Cited

U.S. PATENT DOCUMENTS

| | | | |
|---|---|---|---|
| 682,223 | 9/1901 | Neudecker | 210/235 |
| 778,695 | 12/1904 | McEwen | 210/235 |
| 791,261 | 5/1905 | Ganon | 210/235 |
| 925,931 | 6/1909 | Mathis et al. | 210/235 |
| 977,414 | 11/1910 | Mathis | 210/235 |
| 1,251,267 | 12/1917 | Moyer | 258/21 |
| 1,257,267 | 2/1918 | MacDonell | 210/335 |
| 2,193,508 | 3/1940 | Cordts | 210/156 |
| 3,272,337 | 9/1966 | Elwell | 210/136 |
| 3,300,050 | 1/1967 | Perry | 210/234 |
| 3,363,762 | 1/1968 | Ensign | 210/136 |
| 3,628,662 | 12/1971 | Kudlaty | 210/136 |
| 4,000,072 | 12/1976 | Sato et al. | 210/321.81 |
| 4,077,876 | 3/1978 | Southall | 210/136 |
| 4,303,514 | 12/1981 | Theorell | 210/136 |
| 4,303,515 | 12/1981 | Rademacher | 210/169 |
| 4,529,514 | 7/1985 | Gruett | 210/234 |
| 4,711,723 | 12/1987 | Bray | 210/652 |
| 4,810,272 | 3/1989 | Overby | 55/420 |
| 4,818,397 | 4/1989 | Joy | 210/232 |
| 4,882,061 | 11/1989 | Petrucci et al. | 210/652 |

Primary Examiner—Robert A. Dawson
Assistant Examiner—Wanda L. Millard
Attorney, Agent, or Firm—McAulay Fisher Nissen Goldberg & Kiel

[57] ABSTRACT

Compound filters using two different filter element types are disclosed. When a carbon element is used it is of the concentric type having a central cavity. Filter elements for filtering very fine particles are used in addition. Various types of such elements, including hollow fiber elements, are disposed in a lower portion and/or upper portion. Flow control arrangements, improved filter element removal arrangements, improved filter sealing arrangements, accommodations for filter elements having different lengths and tolerances and filter arrangements for preventing liquid flow when no filter element is present are described.

12 Claims, 10 Drawing Sheets

CONSTRUCTION OF CANISTER-TYPE FILTERS

BACKGROUND OF THE INVENTION a) Field of the Present Invention

The present invention relates to liquid filters and, in particular, to canister type filters for filtering liquids.

b) Background of the Prior Art

Filters for the removal of fine particles from liquids are known. It is well known, for example, to use various forms of activated carbon filters for such purposes. These carbon elements eliminate contaminants which affect taste or have odors and also remove silt and sediment in the liquid. Such filters are generally not fine enough to remove bacteria or viruses.

Canister type filters have been known to have other problems relating to their use. Problems in filter closure, flow control, sealing and flow protection of the filter element often arise.

The present invention is directed to solving and overcoming many of these problems associated with the construction and use of such filters.

SUMMARY OF THE PRESENT INVENTION

In accordance with the present invention, a cylindrically-shaped, compound filter for filtering liquids comprises a lower portion having a cylindrical, carbon-type first filter element disposed therein having a liquid entry port arranged about an outer portion of the element and a flow control tube arranged at a central portion of the first filter element. The flow control tube has a lower entry area for admitting liquid passing through the first filter element. A second filter element is disposed within the flow control tube. The second filter element has microscopic openings therein for filtering predetermined microscopic particles. An upper portion is also included. The upper portion has a solid outer wall for preventing liquid from escaping and a liquid exit port arranged near an end thereof, whereby the compound filter provides the filtering benefits of a carbon filtration system together with the capability of filtering microscopic particles in an efficient, compact manner.

The invention encompasses various forms of compound filters. The invention also encompasses flow control arrangements for filters, improved filter element removal arrangements, improved filter sealing arrangements, accommodations for filter elements having different lengths and tolerances and filter arrangements for preventing liquid flow when no filter element is present.

For a better understanding of the present invention, reference is made to the following description and accompanying drawings while the scope of the invention will be pointed out in the appended claims.

DESCRIPTION OF THE PREFERRED EMBODIMENTS

Figure 1:
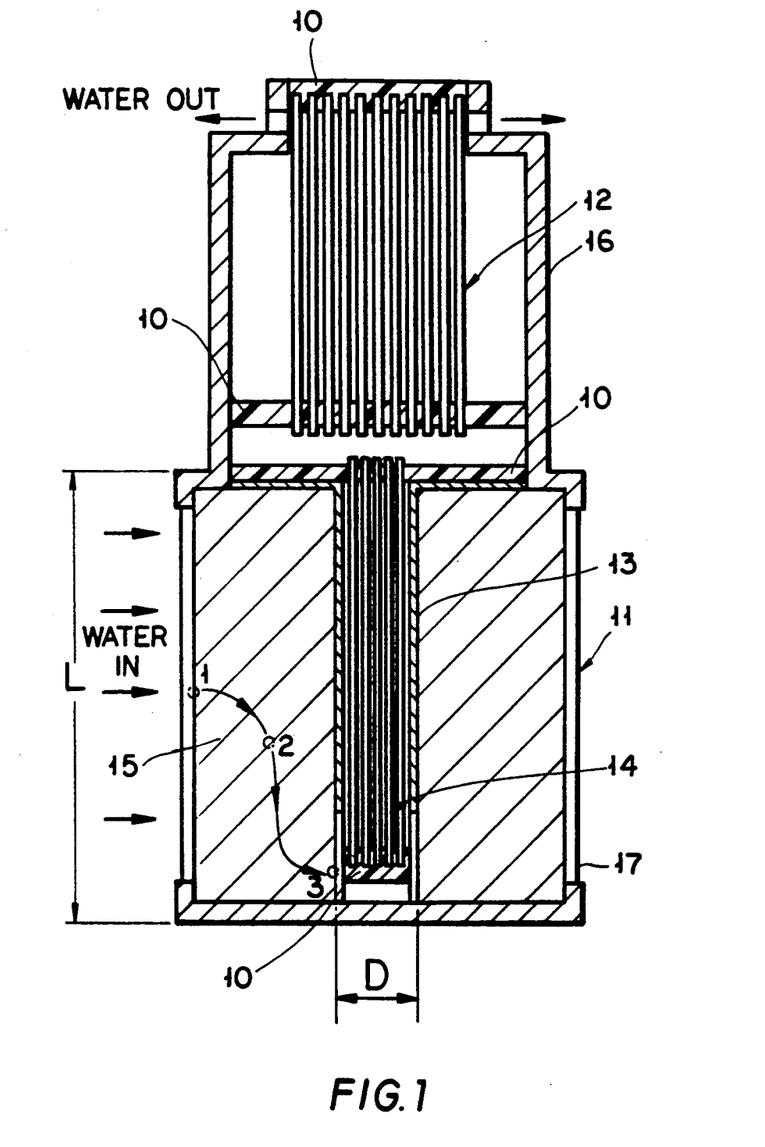
FIG. 1 illustrates a side sectional, partially schematic representation of one embodiment of a filter system of the present invention.

Referring initially to FIG. 1, a filter 11 is shown having two primary filter portions. It is understood that the filter is designed as a cylindrical element and is symmetrical about its central longitudinal axis. The filter includes an upper portion 16 and a lower portion 17. In the upper portion of the filter is disposed a hollow fiber filtration bundle 12. Hollow fiber filters are known in the art and are available for example from Hoechst Celanese by the designation Celgard Microporous-Membrane. Such hollow fibers are constructed typically from polypropylene but may also be constructed from polyethylene or polysulfone. The hollow fibers have microscopic openings therein. By defining the size of the microscopic opening, the nature of the filter can be determined. For example, hollow fibers having pores of 0.2 microns are capable of filtering bacteria. Fibers having pores of 0.05 microns are capable of filtering most viruses. The hollow fibers typically have an outside diameter of 0.060 inches. In the upper portion of the filter, they are arranged by being potted by standard epoxy potting material 10 at both ends of the fiber.

The lower portion of the filter comprises two elements, a carbon filtration system 15 and another hollow fiber bundle 14. Hollow fiber bundle 14 is inserted centrally to the surrounding carbon portion. The fiber bundle 14 is also potted at top and bottom of the elements by use of an appropriate epoxy compound.

The hollow fiber elements 14 are surrounded by a flow control tube 13 which will be described more fully with respect to FIG. 2.

The filter as shown in FIG. 1 may be constructed with both sets of fiber elements as shown or with only one. When both elements are provided, they may have the same or different pore size. In a preferred embodiment, the selected pore size is 0.1 microns. If one of the bundles is dispensed with, it is preferred that bundle 12 be eliminated.

The overall length of the filter shown in FIG. 1 is typically 10 inches and length L is preferably about 4 inches. The dimension D, reflecting the diameter of the flow protection tube with included hollow fiber elements, may range from 2.5 to 4.0 inches. Increasing the dimension D changes the flow rate through the filter. The elimination of the upper bundle 12 may be accompanied by extending the lower length L to encompass the entire length of the filter assembly, i.e., the entire filter would include both a carbon outer portion with a central hollow fiber portion.

The hollow fibers 12, 14 described above may be effectively replaced in the FIG. 1 configuration by any of the following known filter elements: ceramic filters, spiral wrapped microfilter membranes, flat microfilter sheets and pleated microfilter membranes. These alternative filter elements have filtration capability which is equivalent to hollow fibers.

The combination filter shown in FIG. 1 thus provides the known benefits of activated carbon with a capability of filtering very small particles such as bacteria or viruses.

Figure 2:
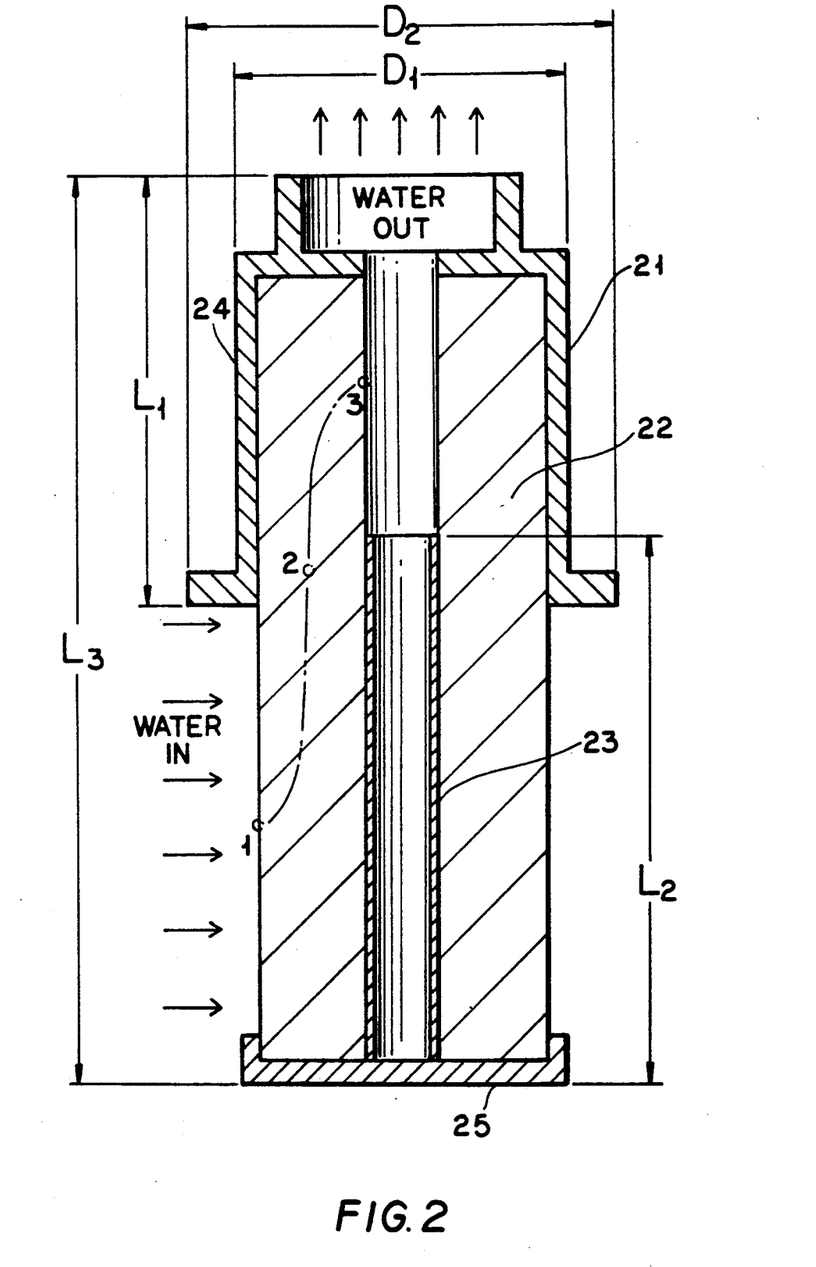
FIG. 2 illustrates a side sectional view of a flow control system for use in a filter in accordance with the present invention.

Now, referring to FIG. 2, a flow control technique for a filter construction such as a carbon filter is illustrated. The filter includes an upper cap 21 and a lower cap 25. Disposed in the filter is a carbon portion 22 which may be either molded, block carbon or a granular activated carbon. If the latter is used, a full lower cap would be required. Sealing may occur at any point on the diameter of area 24.

Within the central portion of the filter is disposed a flow control tube which is a cylindrical tube composed of a resin material such as Sybron Ional C-266. The flow control tube forces the water to take a longer path through the carbon indicated by points 1, 2 and 3, thus providing added filtration for the incoming fluid. The arrangement of the embodiment shown in FIG. 2 has been designed to optimize the filter, despite the increased filtration, by avoiding plugging of the filter as much as possible.

The filter length $L_3$ is typically chosen to be 10 inches long and a preferred flow control tube height, $L_2$, is 70% of length $L_3$ while the upper cap area, $L_1$, is 50% of $L_3$ ($L_1$ and $L_2$ overlap at 2). The preferred inner dimension $D_1$ is in the 2.5 to 3 inch range while the outer dimension $D_2$ is preferred to be about 3.25 to 4 inches.

Depending on the degree of filtration and the length of life expected from the filter (when the filter would be sufficiently clogged for removal or exchange), the dimensions can be varied to suit the particular application.

Figure 3:
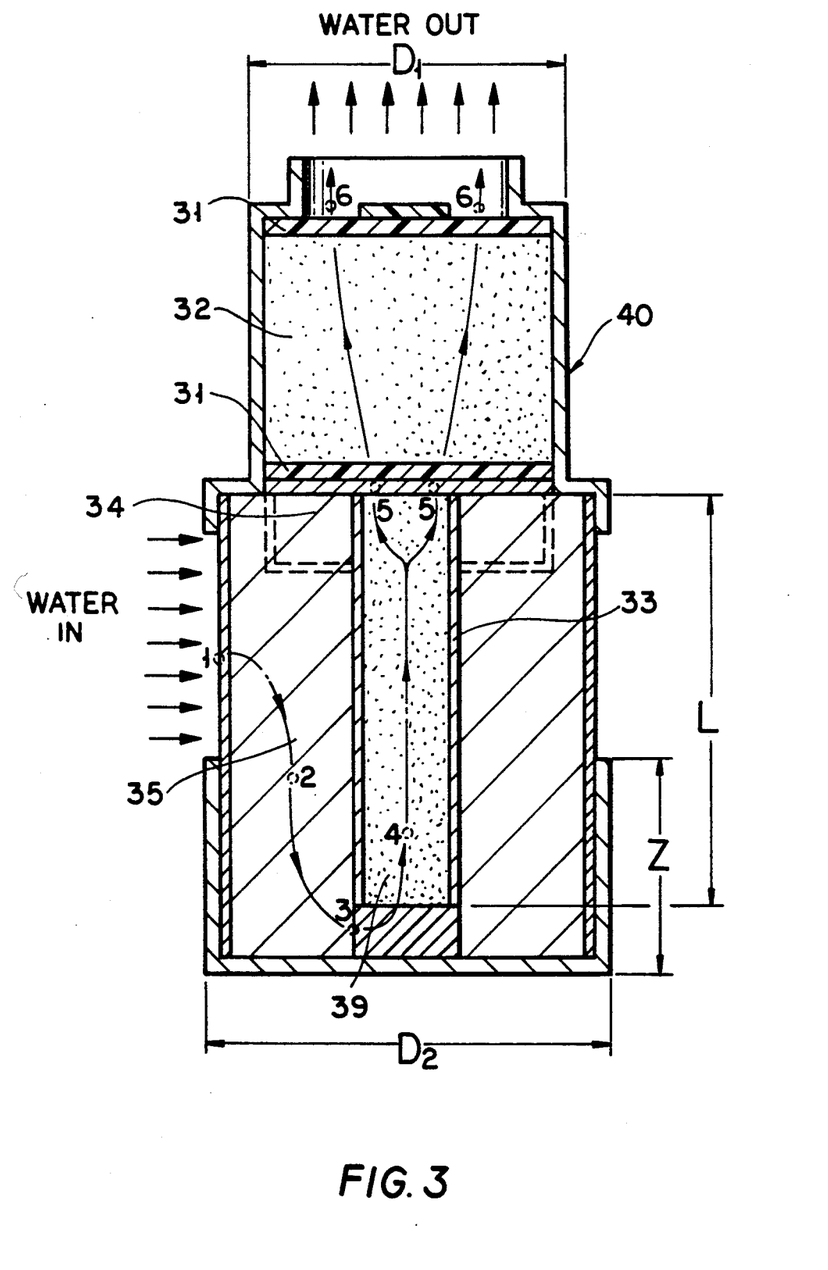
FIG. 3 represents a partially schematic, side sectional view of a combination filter in accordance with an embodiment of the present invention.

Referring now to FIG. 3, another combination filter in accordance with the present invention is illustrated. Again, the filter includes an upper portion 40 and a lower portion 41. In the lower portion of the filter, a carbon element is disposed 35 which preferably is a molded carbon block having pore size of approximately 0.5 microns with, possibly, resins added. The carbon portion surrounds a flow control baffle and tube 33. The upper portion includes rayon filter sheets 31 at top and bottom for filter media containment typically having pore size of 1 micron. In the portion 32 of the upper element and portion 39 in the lower element are disposed one or more of the chosen post-filtration media. Depending on the application, such media will include: a) cation resin for filtering ionic metals, typically a resin material such as Purolite C-100; b) a non-metals reduction resin, typically Purolite A-600; c) a mixed bed resin, typically Purolite MB-400; d) no media; e) granular activated charcoal; f) 0.2 micron rayon sheets. The same variety of filtration media as discussed with respect to 32 may be inserted within the flow control tube in the portion indicated as 39.

A flow control baffle and tube provides an optimum relationship of filter path to cross sectional area for minimizing plugging in the filter. The length of the tube L and the lower cap side Z creates the appropriate relationship. In one particular preferred embodiment, L is chosen to be about 5 inches and Z about 2½ inches.

Typical dimensions of $D_1$ and $D_2$ are 2½ inches and 4 inches respectively.

A possible counter bore 34 of the upper area 32 may be provided for additional such filtration media.

The selection of the particular filtration media desired, 32, 39, are chosen depending upon the contaminants to be reduced.

Figure 4A:
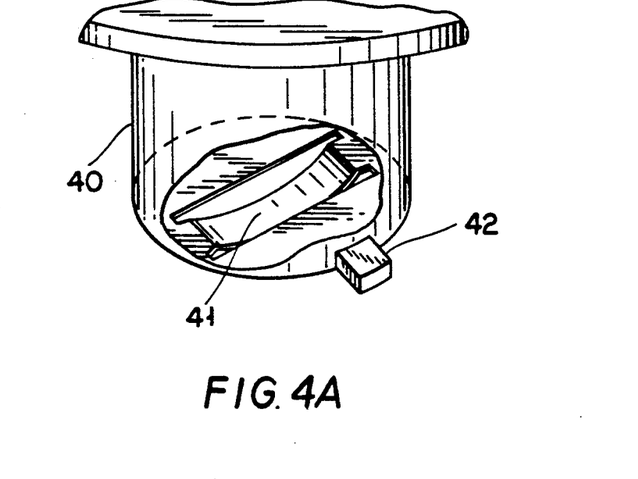
FIGS. 4A and 4B illustrate an interlocking cap for a filter in accordance with the present invention.
Figure 4B:
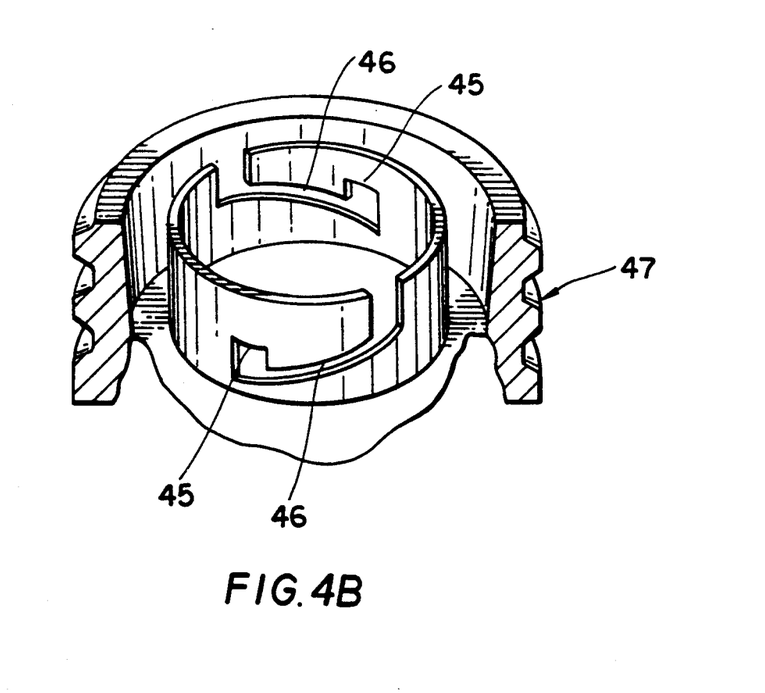

Now referring to FIGS. 4A and 4B, an interlocking cap 4A canister filter is shown. The problem often arising in such filters is the difficulty in gripping and removing the filter element from the housing. By interlocking the filter base to the cap, the filter element can be thus manipulated by the cap. In the figures, filter base 40 is shown having spring 41 and a tab 42. The cap 47, includes a groove portion 46 having a notch 45. Spring 41 is molded into the cap portion. Inserting the base into the cap and rotating will cause the tabs 42 to be pushed upwardly by the spring and locked into the notches 45 to allow for both clockwise and counterclockwise rotation. Groove 46 is constructed having the same pitch as the threads to allow for molding the grooves when molding the cap threads.

Figure 5A:
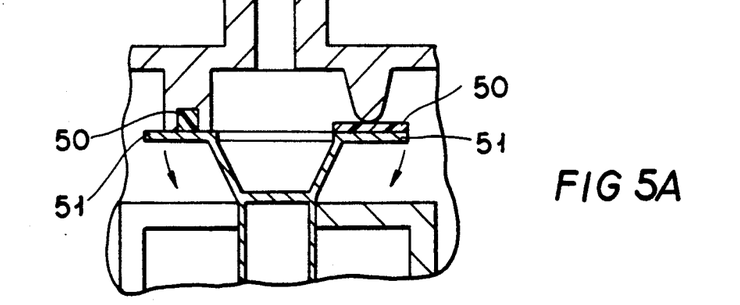
FIGS. 5A, 5B, 5C, 5D and 5E illustrate various solutions relating to problems which arise in filter sealing.

Now referring to FIGS. 5A, 5B, 5C, 5D, 5E, 6A and 6B, various techniques for providing filter sealing are shown. FIG. 5A illustrates a solution to problems arising from tolerance differences in filter length. By disposing the sealing area 50 between the filter housing closure and the filter element on a flexible disk 51 which flexes under cantilever load, the problem of different length filter elements is overcome. Different variations on this theme may be designed.

Figure 5B:
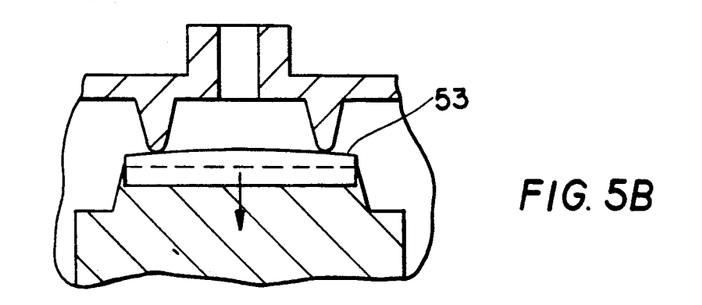

Referring now to FIG. 5B, an alternate solution to the problem of filter length tolerance is presented. Here, the filter top is designed as a thin shell overmolded with a seal 53. The filter would be chosen to have a length such that the filter top would flex when the filter is assembled in the filter housing.

Figure 5C:
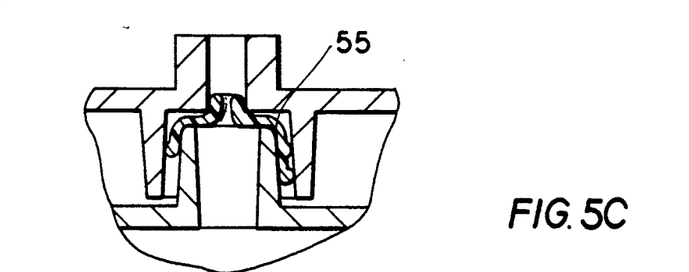
Figures 5D, 5E:
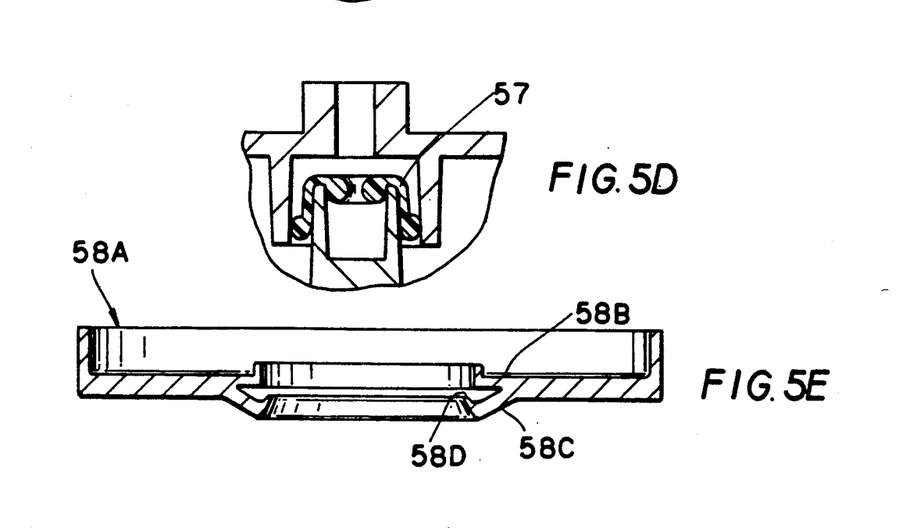

In FIGS. 5C and 5D, two solutions to provide a flow control orifice are presented. Such a flow control orifice is often costly because it requires extra components. In FIG. 5C, an overmold 55 is created to provide an orifice on the filter which interfaces with a sized cavity in the filter housing. In FIG. 5D, an alternate version provides molding an orifice 57 which fits snugly over the filter outer diameter and works internally to the filter. Both approaches provide a simple yet effective flow control orifice by molding techniques.

FIG. 5E illustrates another sealing arrangement for overcoming the prior art difficulty of sealing by controlling filter lengths and compressing the end seals. Filter length sensitivity is eliminated by creating a peripheral sealing device. This is done by molding the sealing device 58A into the filter end cap. A preferred material for this approach is $R_A$64 Santoprene. The blow-up portion of FIG. 5E illustrates that a molded-in undercut (58B) prevents by-pass flow. The area 58C of the blow-up of FIG. 5E as a result of the lip-seal angle results in a pressure differential creating an increased sealing effect. The narrow contact corner area 58D, provides crushability for sealing. The dimensions indicated on FIG. 5E are for reference only and are not intended to limit the scope of the present invention.

Figure 6A:
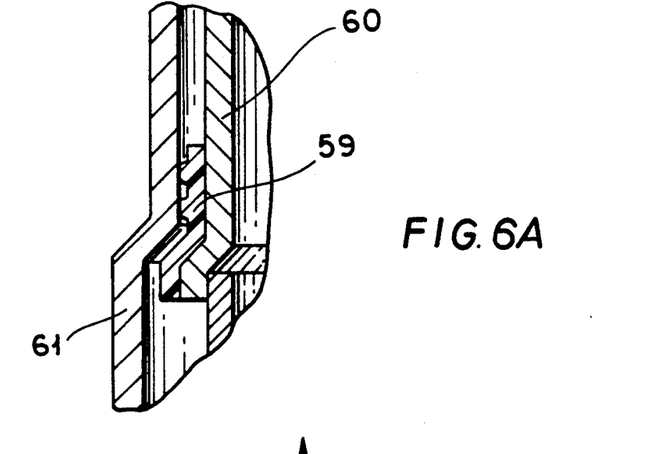
FIGS. 6A and 6B show further solutions to problems which arise in filter sealing.

FIG. 6A illustrates a solution to a problem arising relating to tolerance control on the filter length for providing proper axial seals and similar diametric control on radial seals. The solution depicted provides overmolding a soft durometer thermoplastic on the perimeter of the filter housing 61 which has two radial bumps to simulate "O" rings. The seal is shown as 59 disposed between the filter housing and the filter itself 60.

Figure 6B:
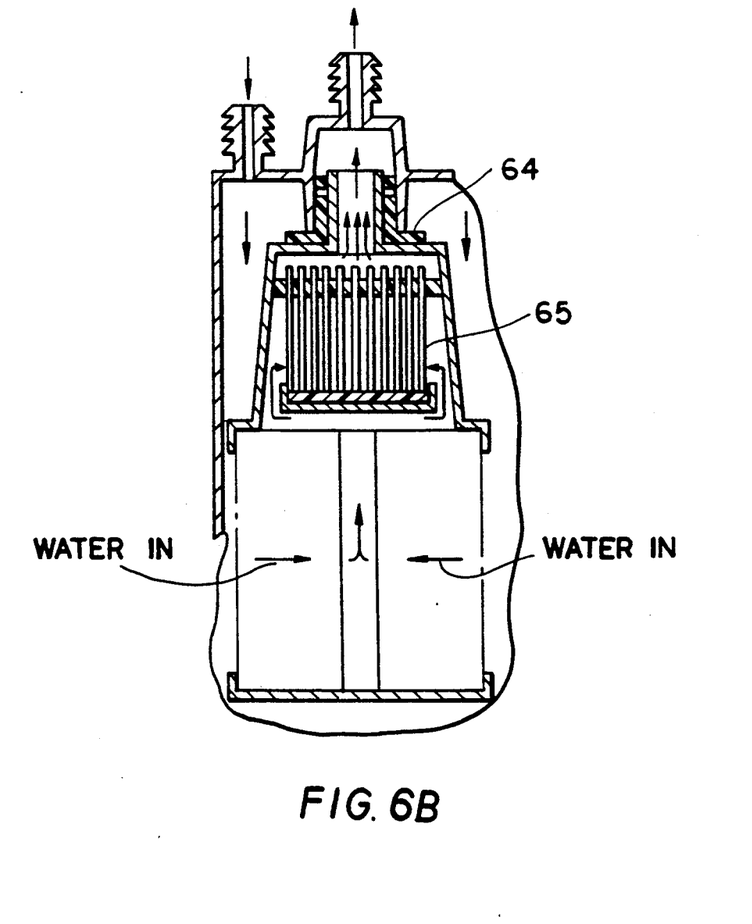

A further sealing problem relating to tolerances of filter elements, particularly diameter tolerances, is addressed in FIG. 6B. A combination filter as previously described can have a substantially reduced radial sealing diameter by rotating the hollow fiber filter portion 180° to achieve a smaller seal outlet diameter 64. Note that the water flow follows the arrow direction in FIG. 6B. A further optional seal improvement may be provided by overmolding an "O" ring combined with a flat washer in appropriate sealing areas.

Figure 7A:
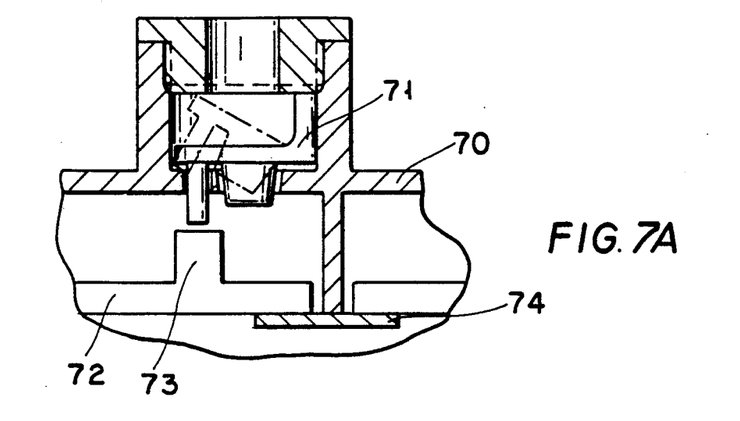
FIGS. 7A, 7B and 7C illustrate different embodiments for preventing fluid flow when no filter element is present.

A very significant problem often arising in filter construction relates to preventing water flow unless a filter element is present. Solutions to this problem, in accordance with the invention, are presented in FIGS. 7A, 7B and 7C. In FIG. 7A, a rubber flap-type valve 71 is located in the housing 70 as shown. The flap is actuated by a bump 73 located on the filter 72. In conjunction with this, or alternatively, a foil 74 subject to being pierced by an element on the filter housing would prevent contamination prior to usage.

Figure 7B:
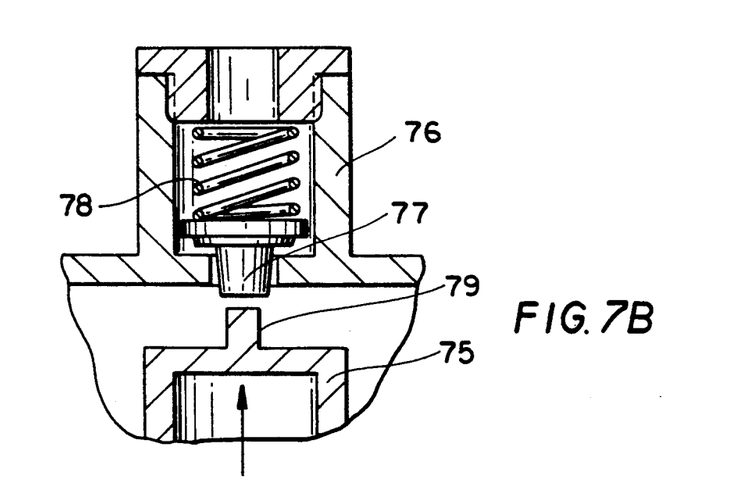

In FIG. 7B, a similar construction is provided where a valve 77 biased by a spring 78 is subject to being opened by a protrusion 79 on the filter 75.

Figure 7C:
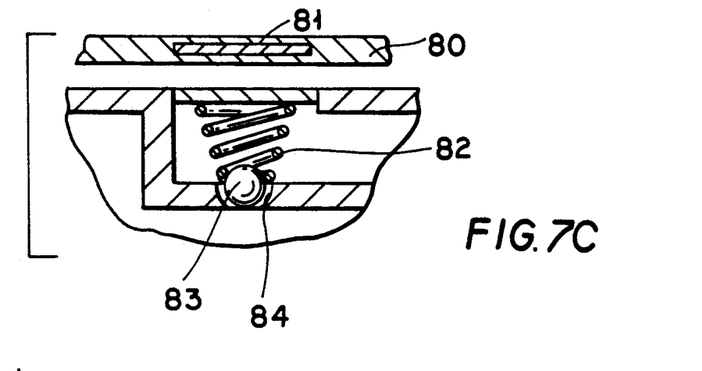

Another arrangement is shown in FIG. 7C. In this configuration a magnetic grade stainless steel ball 83 seals the filter housing orifice 84 by being biased by a lightweight spring 82. The ball is drawn upward by a magnet 81 embedded in the filter element when the filter is installed to allow for fluid flow.

Figure 8:
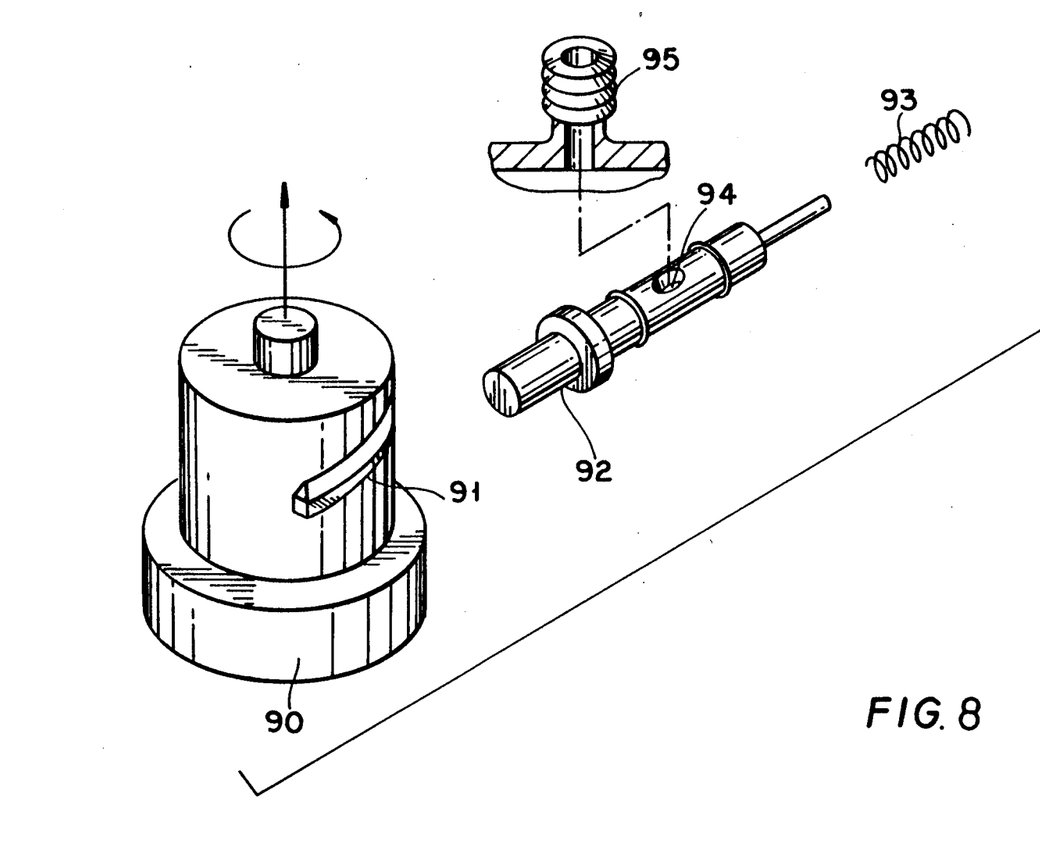
FIG. 8 illustrates a further approach to filter flow protection by combining this protection with an interlocking filter cap.

FIG. 8 illustrates another arrangement for providing filter flow protection which in this case operates with an interlocking cap. Previously mentioned above is a technique for interlocking the filter to the cap. It is also desired in such construction to provide a shut off device which works in conjunction with the filter rotation. A filter 90 is provided with a cam 91 located on the filter diameter. The cam comes in contact with the spring loaded plunger 92 (biased by spring 93). Plunger 92 has an alignable through-port 94. Port 94 aligns with the flow orifice in the cap 95. The cam is contacted when the filter seal is close to being seated. Upon alignment of the port with the orifice, fluid flow is possible.

Figures 9, 9B:
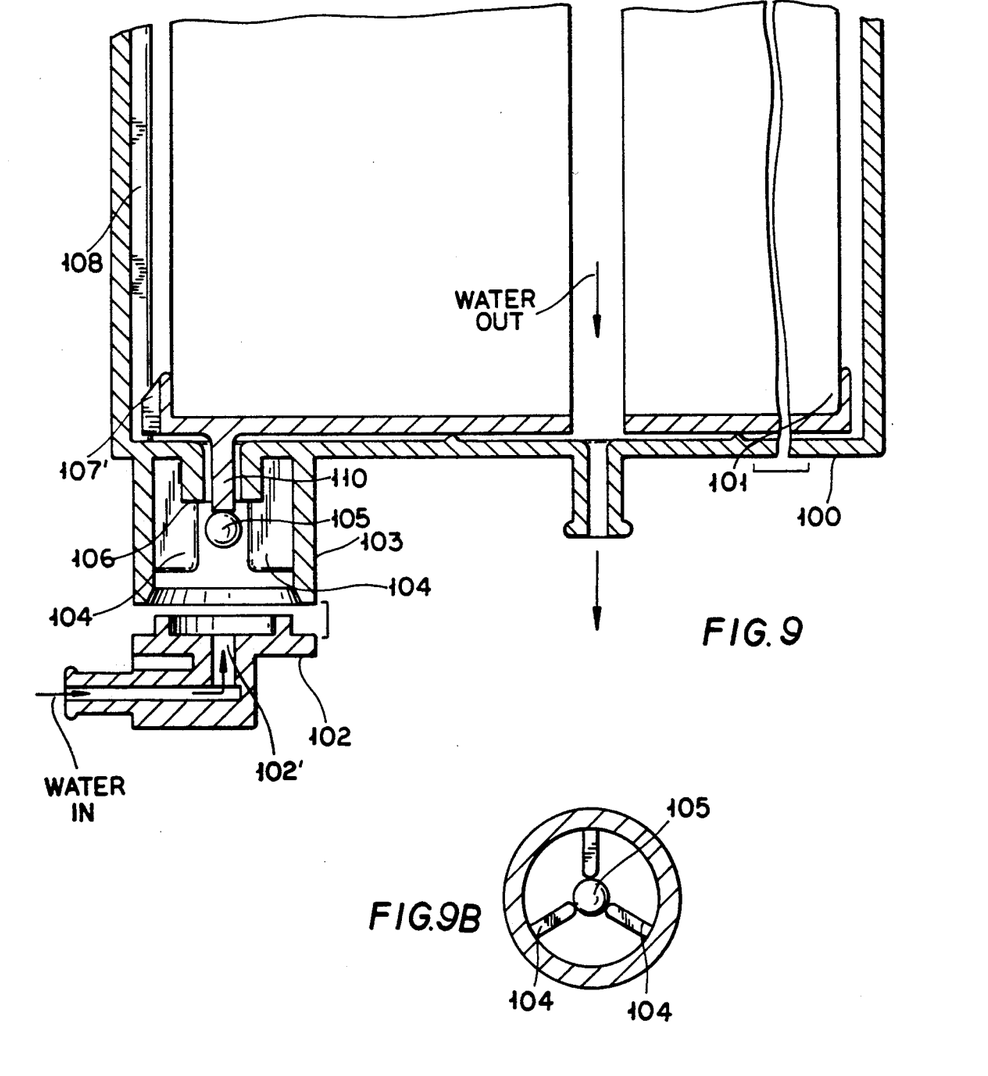
FIG. 9 represents a preferred filter interlock arrangement.
FIG. 9B is an end view of a portion of the arrangement of FIG. 9.
Figure 9A:
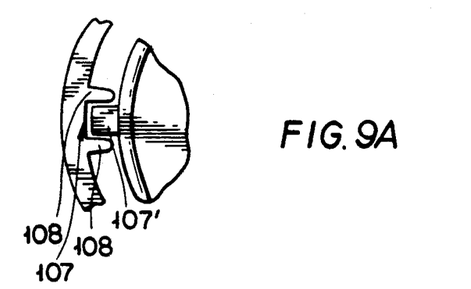
FIG. 9A is a partial top view thereof.
Figure 9C:
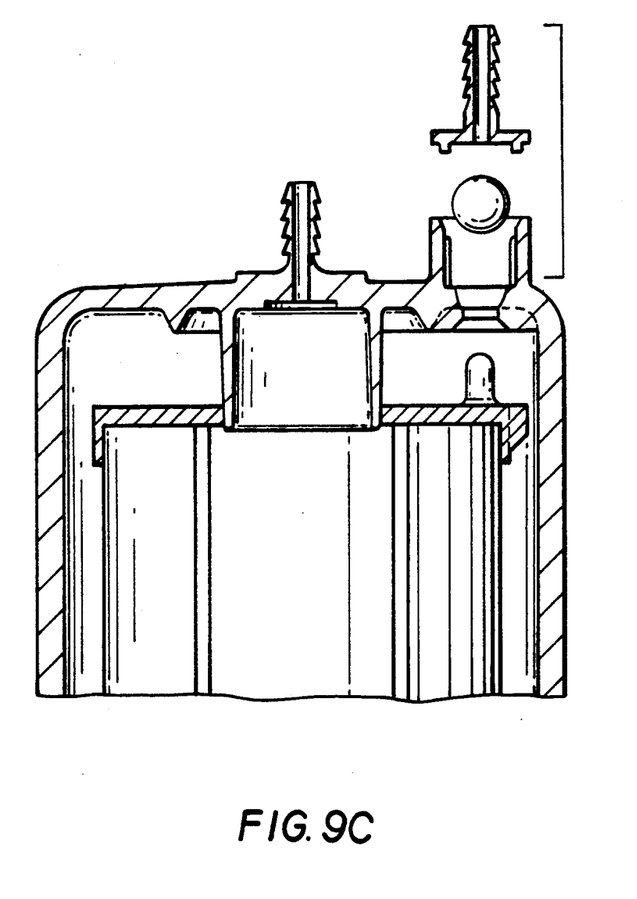
FIG. 9C is a more accurate representation of the concept shown in FIG. 9.

A preferred filter interlock arrangement is presented in FIGS. 9, 9A, 9B and 9C. FIG. 9 illustrates an asymmetrical "keyed" filter which takes advantage of water pressure to press a ball valve against a seat to prevent liquid flow into the filter when no filter element is present (see also FIG. 9C).

The filter 101 is aligned, upon insertion, with the housing by way of a key way 107 formed by guide ribs 108. A key 107' on the filter is slid, upon insertion, between the guide ribs 108. When the filter is inserted, an element 110 protrudes through a valve seat 106 within a liquid (water) inlet to permit liquid flow into the filter. Guide ribs 105 are provided (see FIG. 9B) for directing the valve seating ball 105, typically composed of Nitrile. An outer portion of the inlet 102 is inserted and attached, such as by sonical welding to the inner inlet portion 103. The ball 104 will close inlet opening 102 by water pressure when no filter is present.

While the foregoing description and drawings represent the preferred embodiments of the present invention, it will be obvious to those skilled in the art that various changes and modifications may be made therein without departing from the true spirit and scope of the present invention.

What is claimed is:

1. A cylindrically-shaped compound filter system for filtering liquids comprising:
   a lower portion having a cylindrical, first carbon type filter element disposed therein having a liquid entry port arranged about an outer portion of said first filter element;
   a flow control tube arranged at a central portion of said first filter element, said flow control tube having a lower entry area for admitting liquid passing through said first filter element;
   a second filter element being disposed within said flow control tube, said second filter element having microscopic openings therein for filtering predetermined microscopic particles; and
   an upper portion, said upper portion having a solid outer wall for preventing liquid from escaping and a liquid exit port arranged near an end thereof;
   whereby the compound filter provides the filtering benefits of a carbon filtration system together with the capability of filtering microscopic particles in an efficient, compact arrangement.

2. The filter system of claim 1 wherein said second filter element is composed of a hollow fiber filtration bundle having microporous openings therein.

3. The filter system of claim 2 wherein said bundle has openings of the size of 0.2 microns for filtering bacteria.

4. The filter system of claim 2 wherein said bundle has openings of the size of 0.05 microns for filtering viruses.

5. The filter system of claim 2 wherein said first and second elements extend into the upper portion.

6. The filter system of claim 2 including another hollow fiber filtration bundle having microporous openings being disposed in said upper portion.

7. The filter system of claim 2 wherein said second filter element is disposed by potting the element at either end.

8. The filter system of claim 6 wherein said another bundle is disposed in the upper portion by potting at either end.

9. The filter system of claim 1 wherein said second filter element is a ceramic filter.

10. The filter system of claim 1 wherein said second filter element includes spiral wrapped microfilter membranes.

11. The filter system of claim 1 wherein said second filter element includes flat microfilter sheets.

12. The filter system of claim 1 wherein said second filter element includes pleated microfilter membranes.

* * * * *